United States Patent [19]

Henton

[11] 4,439,582

[45] Mar. 27, 1984

[54] BLENDS OF AROMATIC POLYCARBONATE WITH RANDOM COPOLYMERS OF A MONOVINYLIDENE AROMATIC AND AN UNSATURATED CARBOXYLIC ACID

[75] Inventor: David E. Henton, Midland, Mich.

[73] Assignee: The Dow Chemical Company, Midland, Mich.

[21] Appl. No.: 354,477

[22] Filed: Mar. 3, 1982

Related U.S. Application Data

[63] Continuation-in-part of Ser. No. 223,606, Jan. 9, 1981, abandoned.

[51] Int. Cl.$^3$ .................... C08L 51/04; C08L 69/00
[52] U.S. Cl. .................................... 525/67; 525/68; 525/148
[58] Field of Search .................... 525/148, 67, 68; 526/272

[56] References Cited

U.S. PATENT DOCUMENTS

| | | | |
|---|---|---|---|
| 2,297,351 | 9/1942 | Gerhart | 526/272 |
| 3,462,515 | 8/1969 | Cantrill | 525/68 |
| 3,699,842 | 9/1976 | Ludwig et al. | 525/68 |
| 3,862,998 | 1/1975 | Koehler et al. | 525/148 |
| 3,954,905 | 5/1976 | Margotte et al. | 525/148 |
| 4,082,715 | 4/1978 | Mercier et al. | 525/148 |
| 4,218,544 | 8/1980 | Henton | 525/67 |

FOREIGN PATENT DOCUMENTS 7675 11/1968 South Africa ................ 525/68

*Primary Examiner*—J. Ziegler

[57] ABSTRACT

Blends of an aromatic polycarbonate, such as a polycarbonate of bisphenol-A, with a monovinylidene aromatic/carboxylic acid random copolymer, such as styrene/acrylic acid copolymer, exhibit improved impact strength and heat resistance. Such blends are particularly useful in the manufacture of molded parts which must be exposed to high temperature during manufacture and use. An example of a particularly desirable blend is a blend of a homopolycarbonate of bisphenol-A with styrene/acrylic acid copolymer and an acrylate resin containing grafted and nongrafted butadiene rubber and methyl methacrylate/ethyl acrylate random copolymer.

10 Claims, No Drawings

BLENDS OF AROMATIC POLYCARBONATE WITH RANDOM COPOLYMERS OF A MONOVINYLIDENE AROMATIC AND AN UNSATURATED CARBOXYLIC ACID

CROSS-REFERENCE TO RELATED APPLICATION

This application is a continuation-in-part of copending application Ser. No. 223,606, filed Jan. 9, 1981, now abandoned.

BACKGROUND OF THE INVENTION

This invention relates to blends of an aromatic polycarbonate with a monovinylidene aromatic/acid copolymer.

The polycarbonates of dihydric phenol such as bisphenol-A, which are described in U.S. Pat. No. 3,028,365, are known to be useful in the manufacture of molded plastic parts. Such resins are notably tough and have moderately high softening temperatures. Unfortunately, however, as a result of their relatively poor melt flow characteristics, such polymers are generally more difficult to mold than is often desirable. Also, such aromatic polycarbonates are relatively expensive materials; thus, it is often desirable to blend them with less expensive polymers such as ABS resins and the like.

Previous attempts to improve melt flow characteristics of these aromatic polycarbonates have generally involved incorporating lower melting and/or less expensive polymers into the polycarbonate. See, for example, U.S. Pat. Nos. 3,130,177; 3,239,582; 3,966,842; 3,862,998 and 3,880,783. The blends resulting from such attempts generally exhibit improved melt flow properties at the sacrifice of other desirable features such as heat resistance, impact strength and the like.

In view of the deficiencies of conventional polycarbonates and blends thereof, it would be highly desirable to provide an economical polycarbonate composition which exhibits improved processability while retaining most of the physical properties characteristic of the original polycarbonate.

SUMMARY OF THE INVENTION

The present invention is such a desirable polycarbonate composition. This composition is a heterogeneous blend comprising at least one polycarbonate of a dihydric phenol blended with at least one copolymer of a monovinylidene aromatic monomer and an $\alpha,\beta$-ethylenically unsaturated carboxylic acid (hereinafter called an acid copolymer). The acid copolymer is present in an amount sufficient to improve the melt processability of the polycarbonate.

Some compositions of this invention also contain at least one polymer of a polar ethylenically unsaturated monomer other than an acid (hereinafter called compatible polymer) and a rubber component. The compatible polymer functions to improve the flow rate of the blend under the shear conditions which are characteristic of the fabrication of polycarbonate blends without reducing the Gardner Dart impact strength of the blend to a value below about 100 inch-pounds as determined by the test method described hereinafter. In addition, at least a portion of the rubber component is a graft copolymer of a rubber polymer which is grafted with at least a portion of either the acid copolymer or the compatible polymer or both. Also for the purposes of this invention, a block copolymer of a rubber polymer which is blocked with a portion of the acid copolymer, the compatible polymer or both is a suitable substitute for said graft copolymer. Herein, the term "rubber component" shall be generic to include all rubber in the blend in grafted or blocked as well as nongrafted/nonblocked form. Similarly, the terms "acid copolymer" and "compatible polymer" shall include both nongrafted/nonblocked and grafted/blocked portions of said polymers.

The polycarbonate blends of this invention are suitably employed in most applications in which polycarbonates and various rubber modified polymers have previously been utilized. Applications of particular interest for these polycarbonate blends are housings for electrical appliances, radio and television cabinets, automotive equipment including ornaments, and business machine housings and the like.

DETAILED DESCRIPTION OF ILLUSTRATIVE EMBODIMENTS

In the heterogeneous polycarbonate compositions of this invention comprising the polycarbonate and acid copolymer, the proportions of polycarbonate and acid copolymer are sufficient to provide the blend with the following properties: (1) a Gardner Dart impact strength of at least about 100 inch-pounds, (2) a notched Izod impact strength as determined by ASTM D-256 of at least 3 foot-pounds/inch of notch, (3) a heat resistance as determined by ASTM D-648 (66 psi unannealed) of at least about 210° F., preferably greater than 220° F., and (4) melt processability (injection pressure) of less than about 9000 pounds per square inch (psi) at a mold fill time of 3.0 seconds. Advantageously, these heterogeneous blends comprise from about 25 to about 99, preferably from about 25 to about 75, weight percent of the polycarbonate and from about 1 to about 90, preferably from about 5 to about 50, most preferably from about 10 to about 45, weight percent of the acid copolymer. In binary blends consisting only of the polycarbonate and the acid copolymer, the blend suitably contains from about 75 to about 99, preferably from 75 to 95, weight percent of the polycarbonate and from about 1 to about 25, preferably from 5 to 25, weight percent of the acid copolymer.

Some of the preferred polycarbonate compositions of the present invention are heterogeneous blends wherein the polycarbonate and the remaining components, rubber, acid copolymer and compatible polymer, exist as at least three separate, and distinct phases, i.e., a polycarbonate phase, a rubber phase and an acid copolymer phase, with the rubber phase always being a disperse phase. So long as the proportions of the blend components are sufficient to provide the blend with the properties set forth hereinbefore, such proportions are not particularly critical. Advantageously, however, the blend comprises from about 25 to about 88, preferably from about 30 to about 70, weight percent of the polycarbonate; from about 10 to about 70, preferably from about 15 to about 50, weight percent of acid copolymer; from 0 to about 35, preferably from 0 to about 30, weight percent of the compatible polymer and from about 2 to about 30, preferably from about 5 to about 20, weight percent of rubber. All of the aforementioned weight percentages are based on the weight of the blend. In blends wherein an emulsion rubber polymer is employed in the rubber component, the most preferred blend optionally exhibits gloss values at an angle of 60° as determined by ASTM D-523 which are greater than 80 percent.

The polycarbonates employed in the blends of this invention suitably contain, and preferably consist essentially of, residues of aromatic diols such as the dihydric phenols represented by the formula:

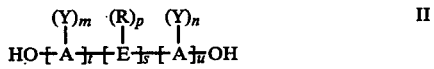

wherein each A is individually an aromatic group such as phenylene, biphenylene, naphthylene, anthrylene and the like; E is alkylene or alkylidene such as methylene, ethylene, ethylidene, propylene, propylidene, isopropylidene, butylene, butylidene, isobutylidene, amylidene or E may be cycloalkylene such as cyclopentylene or cyclohexylene, a sulfur containing linkage such as sulfide, sulfoxide or sulfone, an ether linkage, a carbonyl group, a tertiary nitrogen group, or the like; each R is individually hydrogen or a monovalent hydrocarbon group such as alkyl, aryl, arylalkyl, or cycloaliphatic; each Y is individually chlorine, bromine, fluorine or R wherein R is defined as above; m and n are any whole numbers from and including 0 through the number of positions on A available for substitution; p is any whole number and including 0 through the number of positions available on E; t is any whole number which is 1 or more; s is 0 or 1 and u is any whole number including 0.

Examples of such dihydric phenols include the bis(-hydroxyphenyl)alkylidenes such as 2,2-bis-(4-hydroxyphenyl)propane [bisphenol A]; 2,4'-dihydroxydiphenylmethane; bis-(2-hydroxyphenyl)methane; 1,1-bis(4-hydroxyphenyl)ethane and other bisphenol-A type diols as described in U.S. Pat. No. 3,028,365 as well as the corresponding aromatically substituted or aliphatically substituted dihydric phenols wherein the substituents are halogens such as Cl, F, Br, I, —NO₂, —O—, alkyl, acyl, carboxylate ester, sulfonate ester and the like. Of the foregoing dihydric phenols, bisphenol-A and substituted bisphenol-A are preferred, with bisphenol-A being most preferred.

While not critical, the molecular weight ($M_w$) of said polycarbonate is preferably in the range from about 10,000 to about 65,000, more preferably from about 20,000 to about 40,000, and most preferably from about 23,000 to about 33,000. Preferably, such polycarbonates are prepared by a conventional technique involving the reaction of one of the aforementioned diols or a mixture of such diols with a carbonyl halide such as phosgene in an organic solution containing a base such as pyridine. Suitable methods for preparing such polycarbonates are further described in U.S. Pat. No. 3,028,365.

The acid copolymer employed in the blend of this invention suitably comprises any normally solid random copolymer of at least one monovinylidene aromatic monomer and at least one copolymerizable ethylenically unsaturated carboxylic acid. Preferably, this random copolymer contains polymerized therein from about 40 to about 99, more preferably from about 40 to about 98, weight percent of the monovinylidene aromatic monomer, which is preferably styrene, and from about 1 to about 30, more preferably from about 2 to about 25, weight percent of the acid comonomer which is preferably an α, β-ethylenically unsaturated carboxylic acid, especially acrylic acid, methacrylic acid or mixtures thereof. Beneficially, the amount of the acid comonomer in this random copolymer is sufficient if the acid copolymer, when blended with the polycarbonate, displaces the glass transition temperature (Tg) of the polycarbonate wherein Tg is measured as described hereinafter. Other suitable acids include other α, β-ethylenically unsaturated mono- and dicarboxylic acids such as fumaric, ethacrylic, citraconic, aconitic, itaconic, as well as mixtures of the aforementioned acids. Other suitable monovinylidene aromatic monomers include t-butylstyrene, α-methylstyrene, p-bromostyrene, α-chlorostyrene, p-chlorostyrene, 2,4-dichlorostyrene, p-methylstyrene, 3,4-dimethylstyrene and mixtures thereof. Other copolymerizable monomers such as methyl methacrylate and comparable hard monomers can be employed in the random acid copolymer. Advantageously, the random acid copolymer contains significantly less than 5 weight percent of α, β-ethylenically unsaturated nitrile. Preferably, the random acid copolymer consists essentially of monovinylidene aromatic, methacrylate esters and acid monomers. Molecular weight of the acid copolymer should be sufficient to enable the blend to have a Gardner Dart impact strength of at least 100 in-lbs. The random acid copolymer preferably has a weight average molecular weight ($M_w$) as determined by gel permeation chromatography (GPC based on a polystyrene standard) in the range from about 50,000 to about 300,000, most preferably from about 75,000 to about 275,000.

The random acid copolymer is readily prepared by known methods of radical polymerization, e.g., by bulk polymerization, solution polymerization, emulsion polymerization, etc. Examples of such copolymers and methods for their preparation are disclosed in U.S. Pat. Nos. 3,725,360; 2,927,095; 3,401,153; 2,971,939; 2,769,804 and 3,336,267.

The compatible polymer advantageously contains a normally solid nonelastomeric nongrafted polymer (herein called nongrafted compatible polymer) of at least one ethylenically unsaturated polar monomer other than an ethylenically unsaturated acid (as defined hereinbefore). The polymer is considered compatible for the purposes of this invention if it, when blended with the polycarbonate, displaces the glass transition temperature ($T_g$) of the polycarbonate. $T_g$ is advantageously measured using a mechanical spectrometer, e.g., as manufactured by Rheometrics, Inc. The nongrafted compatible polymer has a solubility parameter in the range from about 8.5 to about 10.5, preferably from about 9.0 to 10.2.

For the purposes of this invention, a polar monomer is a polymerizable ethylenically unsaturated compound bearing a polar group having a group moment in the range from about 1.4 to about 4.4 Debye units as determined by Smyth, C.P., *Dielectric Behavior and Structure*, McGraw-Hill Book Company, Inc., New York (1955). Exemplary polar groups include —CN, —NO₂, —OH, —Br, —Cl, —NH₂,

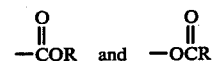

wherein R is alkyl or aryl. Preferably, the polar monomer is an ethylenically unsaturated nitrile such as acrylonitrile, methacrylonitrile and fumaronitrile, and alkyl esters of α, β-ethylenically unsaturated acids, e.g., alkyl acrylates and methacrylates, methyl acrylate, butyl acrylate and methyl methacrylate, with acrylonitrile and methyl methacrylate being most preferred. Preferred nongrafted compatible polymers are copolymers of monovinylidene aromatic monomers as defined hereinbefore and at least one polar monomer, especially acrylonitrile and/or methyl methacrylate. Most preferred are polymers containing from 0 to about 85 mole percent of styrene, from 0 to about 60 mole percent of acrylonitrile, from 0 to 100 mole percent of methyl methacrylate and from 0 to about 10 mole percent of ethyl acrylate. The molecular weight of the nongrafted compatible copolymer is not particularly critical so long as the compatible copolymer can be melt blended with the other components of the blend. Preferably, however, the nongrafted compatible polymer has a weight average molecular weight ($M_w$) as determined by gel permeation chromatography in the range from about 40,000 to about 300,000, preferably from about 60,000 to about 300,000.

In general, methods for preparing the compatible copolymer are not particularly critical since the desired improvement of physical properties of the blend imparted by the compatible copolymer is achieved regardless of the method for preparing said compatible copolymer. Accordingly, these copolymers can be prepared by known methods of radical polymerization, e.g., by bulk polymerization or polymerization in solution, suspension or emulsion polymerization or by a combined process such as precipitation and bulk/suspension processes. Examples of such nongrafted compatible polymers and such processes for preparing them are set forth in U.S. Pat. Nos. 3,660,535; 3,499,059 and 3,422,981.

The rubber polymers useful as the rubber portion of the rubber component are, for example, polyurethane rubber, ethylene/vinyl acetate rubber, silicone rubber, polyether rubber, polyalkenamer rubber, ethylene-propylene-diene rubber, acrylate rubbers such as butyl acrylate rubbers described in U.S. Pat. No. 3,502,604, and the so-called diene rubbers, i.e., homopolymers of conjugated dienes which contain from 4 to 8 carbon atoms such as butadiene, isoprene, piperylene and chloroprene, copolymers of such dienes with each other and copolymers of such dienes with one or more other monomers such as styrene, acrylic or methacrylic compounds such as acrylonitrile, methacrylonitrile, acrylic acid, methacrylic acid, butyl acrylate, methyl methacrylate, or isobutylene. Preferred rubber polymers are the diene rubbers, particularly polybutadiene and copolymers of butadiene with styrene and/or acrylonitrile. As stated hereinbefore, the term "rubber component" as used in the definition of the blends of this invention requires that at least a portion of the aforementioned rubber polymer be grafted with random acid copolymer or compatible polymer, the latter two polymers being described in more detail hereinbefore. In general, the portion of grafted rubber polymer is sufficient to provide increased impact strength (Gardner Dart or notched Izod) as compared to a blend which is similar in all respects except that it contains no grafted rubber polymer. The aforementioned rubber polymers suitably provide the rubber substrate of the grafted rubber polymer as well as satisfactorily perform as the nongrafted rubber when such is present. Of particular interest as rubber polymers are diene rubbers, butyl acrylate rubbers, and ethylene/propylene diene-modified rubbers (often called EPDM rubbers).

In the preferred diene rubber polymers, the amount of diene is sufficient to provide the desired elastomeric character. An especially preferred group of diene rubbers is one containing from about 50 to about 100 weight percent of butadiene and/or isoprene in polymerized or copolymerized form and up to about 50 weight percent of monovinylidene aromatic hydrocarbon such as styrene and/or an unsaturated nitrile such as acrylonitrile in polymerized or copolymerized form. Particularly advantageous are the homopolymers of butadiene and the copolymers of butadiene with up to 50 weight percent of styrene and/or acrylonitrile. The preferred rubber polymers exhibit glass transition temperatures ($T_g$) generally less than 0° C., most preferably less than $-30°$ C. as determined by differential scanning calorimetry. In the blend of this invention, the rubber polymer advantageously has an average particle size of about 10 micrometers or less, preferably in the range from about 0.05 to about 5 micrometers. The molecular weight of the rubber polymer is not particularly critical so long as the rubber polymer is a reinforcing rubber. Advantageously, the rubber polymer, when in the form of the aforementioned rubber component, is capable of reinforcing the random acid copolymer as determined by the Gardner Dart impact resistance test, i.e., a dispersion of the rubber component in the random acid copolymer will exhibit a Gardner Dart impact resistance greater than that of the random acid copolymer.

In addition to the aforementioned monomeric components, it should be understood that the rubber polymer may also contain relatively small amounts, usually less than about 2 weight percent based on the rubber, of a crosslinking agent such as divinylbenzene, diallylmaleate, ethylene glycol dimethacrylate and the like, provided that such crosslinking does not eliminate the desired elastomeric character of the rubber polymer. The rubber polymer is readily prepared by known methods of radical polymerization, e.g., by bulk polymerization or polymerization in solution, suspension or emulsion or by combined process such as precipitation and bulk/suspension processes. Polymerization processes carried out with the aid of organometallic mixed catalysts such as Ziegler or anionic catalysts are also suitably employed in the preparation of the rubber polymer.

In blends wherein a portion of the aforementioned random acid copolymer is to be grafted upon a portion of the aforementioned rubber polymer, the combination of the nongrafted random copolymer and the graft copolymer of rubber polymer and the random acid copolymer is referred to as an acid resin. In such acid resins, the graft copolymer of rubber polymer and random acid copolymer is present in an amount sufficient to provide the resin with a Gardner Dart impact resistance of at least 100 in-lbs, preferably at least 160 in-lbs. The acid resin is prepared by known procedures. Examples of such resins and methods for their preparation are described in U.S. Pat. Nos. 3,642,949; 3,641,212; 3,919,354 and 3,966,842. All of the foregoing references are hereby incorporated by reference in their entirety.

As with the acid copolymer, the compatible copolymer can contain, in addition to the nongrafted compatible polymer, a graft copolymer of the compatible polymer and a rubber polymer (defined hereinbefore). In such instances, the combination of compatible polymer and graft copolymer of the compatible polymer and a rubber polymer is called a compatible resin. In the compatible resin, the graft copolymer is present in an amount sufficient to provide the polycarbonate blend with a Gardner Dart impact resistance of at least 100 in-lbs, preferably at least 160 in-lbs. Of the aforementioned compatible resins, the so-called ABS resins and MBS resins (methyl methacrylate/butadiene/styrene copolymer resins), are especially preferred. Examples of such especially preferred ABS resins are described in U.S. Pat. Nos. 3,660,535; 3,499,059 and 3,422,981.

The method of preparing the compatible resin is similarly not particularly critical. However, it is found that the most improvement in impact resistance is obtained when preformed rubber, preferably in the form of emulsion size particles, is dissolved or dispersed in a mixture of the monomeric component(s) of the nongrafted compatible polymer and thereafter heated to polymerize the monomers. Polymerization can be affected by heating this solution of rubber and monomer in mass, in emulsion, or while dispersed as droplets in an inert aqueous medium and at temperatures between 50° C. and 180° C. and pressures ranging from subatmospheric to superatmospheric. Although not required, it is sometimes desirable to employ a polymerization initiator such as a peroxygen compound or the like. The especially preferred compatible resins, i.e., the ABS resins, are prepared by conventional ABS polymerization methods, e.g., those described in U.S. Pat. Nos. 2,769,804; 3,168,593; 3,243,481; 3,426,103; 3,422,981; 3,499,059; 3,928,494 and 3,660,535 which are incorporated herein in their entirety.

In the preparation of the blend of the present invention, the aforementioned polymeric components are combined by conventional mixing techniques such as admixing granular or particulate polymeric components and subsequent melt blending of the components. Alternatively, the blends may be prepared by heat plastifying the higher melting polymeric components, i.e., the polycarbonate and the acid polymer, and then adding the other components thereto either in granular or heat plastified form. Generally, the order of mixing the blend components is not particularly critical.

One particularly convenient method for preparing the preferred blends in accordance with the present invention is to dry blend a particulate of the polycarbonate with a particulate of the mixture of the remaining rubber component, acid copolymer and compatible polymer. This dry blend is directly fed into a heat fabricating apparatus such as a screw extruder or a reciprocating screw injection molding machine with sufficient mixing. While the particular manner of mixing these components in heat plastified form is not critical, sufficient mixing should be employed to insure a uniform distribution of each of the components throughout the resulted blend. In addition to the foregoing mixing procedures, other conventional mixing procedures may be employed including hot roll milling, kneeding and the like.

In addition to the aforementioned polymeric components, it is sometimes desirable to incorporate other additives into the blend. In this regard, such additives as stabilizers, lubricants, plasticizers, antioxidants, fire retardants, fillers, reinforcing fibers such as glass fibers, pigments and the like can be employed in the blends of this invention in a manner similar to the employment of such additives in conventional polycarbonate blends.

The following examples are given to illustrate the invention but should not be construed as limiting its scope. Unless otherwise indicated, all parts and percentages are by weight.

EXAMPLE 1

A 40-part portion of a particulate form of a homopolycarbonate of bisphenol-A is tumble blended with 30 parts of a particulate form of rubber grafted with methyl methacrylate and ethyl acrylate (compatible resin) and 30 parts of styrene/acrylic acid copolymer (acid copolymer) until an apparently uniform mixture is obtained. The resulting blend is then charged to a Welding Engineer's Twin Screw Extruder having a barrel temperature profile (feed-to-die) as follows: 425° F., 425° F., 450° F., 450° F. and 475° F. and extruded and granulated. Residence time of the blend in the extruder is ~30 seconds and the extruder is operated at 200 rpm. The resulting granules are injection molded at 475°–525° F. into tensile bars (16.26 cm×1.27 cm×0.3175 cm) and impact discs (5.08 cm dia×0.32 cm). These discs and bars are tested for physical strength, impact resistance and heat resistance. The results of these tests are reported in Table I.

For purposes of further illustration of the invention, additional blends containing different amounts of the aforementioned polymeric components as well as blends containing other polymeric components are prepared and tested by the foregoing procedures. The results of these tests are also reported in Table I.

For purposes of comparison, blends (Sample Nos. $A_1$–$A_6$) outside the scope of this invention are prepared and tested by the foregoing procedure. The results of these tests are also reported in Table I.

TABLE I

| Sample No. | Polycarbonate[1] Type | Polycarbonate[1] Amt Pts | Blend Components Acid Resin[2] Type | Acid Resin[2] Amt Pts | Compatible Resin[3] Type | Compatible Resin[3] Amt Pts | Total Component[4] % PCO/AC/CP/R | Total Component[4] | Yield Tensile[5], psi | Elong[6] % | Izod[7] ft-lb/in | Dart[8] in-lb | DTUL[9] °F. | Injection Pressure[10], psi (fill time, sec) | Gloss[11] % |
|---|---|---|---|---|---|---|---|---|---|---|---|---|---|---|---|
| 1 | PCO(a) | 40 | SAA(a) | 30 | AR(a) | 30 | 40/30/14/16 | | 6500 | 116 | 3.3 | 320+ | 237 | 8512 (2.8) | 100+ |
| 2 | " | 40 | " | 30 | " | 30 | 40/44.7/0/15.3 | | 6000 | 8 | 13 | 200 | 240 | 6312 (2.7) | 83 |
| 3 | " | | SMAAR(c) | 30 | | | | | | | | | | | ND |
| | " | 40 | SAA(a) | 30 | | | 40/45/0/15 | | 6400 | 96 | 10 | 180 | 244 | 6875 (2.2) | ND |
| | " | | SMAAR(d) | 30 | | | | | | | | | | | |
| 4 | " | 85 | SAA(a) | 15 | | | 85/15/0/0 | | 9100 | 125 | 3.0 | 320+ | 276 | 7462 (2.2) | ND |
| 5 | " | 70 | SMAAR(e) | 30 | | | 70/23.1/0/6.9 | | 7600 | 113 | 7.5 | 320+ | 268 | 7625 (2.9) | 38 |
| 6 | " | 50 | " | 50 | | | 50/38.5/0/11.5 | | 7100 | 68 | 6.8 | 320+ | 260 | 7625 (2.1) | 40 |
| 7 | " | 50 | SAA(b) | 35 | AR(a) | 15 | 50/35/7/8 | | 8415 | 111 | 7.1 | 320+ | 264 | 6125 (2.7) | 100+ |
| 8 | " | 50 | SAA(a) | 19.7 | AR(b) | 30.3 | 50/19.7/15.1/15.2 | | 6056 | 54 | 6.5 | 320+ | 243 | 7000 (3.0) | 80 |
| 9 | " | 40 | SAA(a) | 37.4 | | | 40/48/0/12 | | 6650 | 92 | 6.5 | 200 | 240 | 4512 (2.2) | 96 |
| | | | SMAAR(f) | 22.6 | | | | | | | | | | | |
| 10 | " | 40 | SAA(a) | 35.8 | AR(c) | 24.2 | 40/35.8/12.1/12.1 | | 7120 | 48 | 7.3 | 320+ | 234 | 4512 (2.3) | 100+ |
| 11 | " | 40 | SMAAR(g) | 60 | | | 40/30/0/30 | | 6565 | 43 | 10.2 | 280 | 236 | 5000 (2.0) | 100+ |
| 12 | " | 40 | SAA(a) | 30 | ABS(d) | 30 | 40/30/17.4/12.6 | | 7131 | 30 | 5.48 | 260 | 234 | 4575 (2.5) | 100 |
| A1* | " | 40 | " | 30 | ABS(e) | 60 | 40/0/47.4/12.6 | | 7095 | 124 | 9.2 | 320+ | 223 | 5400 (1.9) | 100 |
| A2* | " | 40 | SAA(a) | 30 | HIPS(f) | 30 | 40/30/27.6/2.4 | | 6920 | 8 | 0.4 | <20 | 234 | 5000 (1.4) | 42 |
| A3* | " | 40 | " | 20 | " | 35 | 40/20/32.2/7.8 | | 5785 | 118 | 1.1 | <20 | 233 | 5000 (1.5) | 65 |
| | | | | | SBR(g) | 5 | | | | | | | | | |
| A4* | " | 50 | | | MBS(h) | 50 | 50/0/46/4 | | 7725 | 84 | 7.9 | 320+ | 230 | 5000 (1.8) | 99 |
| 13 | " | 50 | SAA(h) | 20 | ABS(d) | 30 | 50/20/17.4/12.6 | | 6645 | 128 | 9.19 | 320+ | 240 | 5962 (1.0) | 100 |
| A5* | " | 40 | " | 30 | ABS(d) | 30 | 40/30/27.4/12.6 | | 6620 | 66 | 4.45 | 90 | 224.5 | 5562 (0.6) | 100 |

*Not an example of the invention.
[1]PCO(a) — homopolycarbonate of bisphenol-A having a $M_w$ as determined by gel permeation chromatography of 24,000-27,000.
[2]SAA(a) — styrene/acrylic acid (92/8) random copolymer having a $M_w$ of 200,000.
SAA(b) — styrene/acrylic acid (85/15) random copolymer having a $M_w$ of ~150,000.
SMAAR(c) — styrene/methacrylic acid resin containing 51% rubber phase and 49% of styrene/methacrylic acid (97%/3%) random copolymer having a $M_w$ of 84,000.
SMAAR(d) — styrene/methacrylic acid resin containing 50% rubber phase and 50% of styrene/methacrylic acid (94%/6%) random copolymer having a $M_w$ of ~100,000.
SMAAR(e) — styrene/methacrylic acid resin containing 23% rubber phase and 77% of styrene/methacrylic acid (91%/9%) random copolymer (mass polymerized).
SMAAR(f) — styrene/methacrylic acid resin containing 53% rubber phase and 47% of styrene/methacrylic acid (91%/9%) random copolymer (mass polymerized).
SMAAR(g) — styrene/methyl methacrylate/methacrylic acid resin containing ~50% rubber phase and ~50% of styrene/methyl methacrylate/methacrylic acid (42%/48%/10%) random copolymer having a $M_w$ of 117,000.
SAA(h) — styrene/acrylic acid (98/2) random copolymer having a $M_w$ of 255,000.
[3]AR(a) — acrylate resin containing 53.3% rubber phase and 46.7% methyl methacrylate/ethyl acrylate (95%/5%) random copolymer wherein resin sold by Rohm & Haas under trade designation KM 611.
AR(b) — acrylate resin containing 50% butyl acrylate rubber phase and 50% poly(methyl methacrylate) having a $M_w$ of ~200,000.
AR(c) — acrylate resin containing 50% rubber phase and 50% styrene/methyl methacrylate (50%/50%) random copolymer (copolymer made by emulsion polymerization).
ABS(d) — ABS resin containing 42% rubber phase and 58% of styrene/acrylonitrile (70%/30%) random copolymer having a $M_w$ (gel permeation chromatography using a polystyrene standard) of 70,000 wherein the rubber is an emulsion polymerized diene rubber.
ABS(e) — a blend of 50 weight percent random styrene/acrylonitrile (75/25) copolymer and 50 weight percent of ABS(d).
HIPS(f) — polystyrene ($M_w$ ~200,000) containing 8% butadiene rubber.
SBR(g) — styrene-butadiene block rubber sold by Phillips Petroleum under the trade name Solprene ® 411S.
MBS(h) — an acrylic resin containing 8% rubber and 92% styrene/methyl/methacrylate (55/45) random copolymer having a $M_w$ of ~200,000.
[4]PCO/AC/CP/R blend content of total polycarbonate (PCO), total acid copolymer (AC), total compatible

TABLE I-continued

| Sample No. | Polycarbonate[1] Type | Amt Pts | Acid Resin[2] Type | Amt Pts | Compatible Resin[3] Type | Amt Pts | Total Component[4] % PCO/AC/CP/R | Yield Tensile[5], psi | Elong[6] % | Izod[7] ft-lb/in | Dart[8] in-lb | DTUL[9] °F. | Injection Pressure[10], psi (fill time, sec) | Gloss[11] % |
|---|---|---|---|---|---|---|---|---|---|---|---|---|---|---|

[4]Values for AC, CP and R include both grafted and nongrafted portions of each. For example, if a blend contains 30% AC resin, 50% of which is rubber (grafted and nongrafted rubber), and contains 30% CP resin, 40% of which is rubber (grafted and nongrafted) the total percent of rubber (R) in blend is 27%, the total percent of AC (grafted and nongrafted AC) is 15% and the total percent of CP (grafted and nongrafted CP) is 28%. The remaining 40% is polycarbonate.
[5]ASTM D-638.
[6]ASTM D-638.
[7]ASTM D-256
[8]Gardner Dart Impact Resistance Test using 3.63 kg drop weight and opening of 3.2 cm on a test disk having a thickness of 3.175 mm and a Dart of 1.59 cm with a radius of curvature of 0.795 cm.
[9]ASTM D-648 (unannealed at 66 psi).
[10]Injection pressure in pounds per square inch required to inject a 25 g sample of heat plastified blend into a mold within the fill time indicated. The temperature profile of the injection molding machine is as follows: Rear zone (feed end of reciprocating screw section) = 470° F. ± 5° F., Front Zone (nozzle end of reciprocating screw section) = 490° F. ± 5° F., Nozzle = 480° F. ± 5° F., Mold = 200° F. ± 10° F. Polymer is injected at 300–500 psi below the flash pressure. Fill time is determined by measuring the time required for the polymer to flow between two pressure transducers wherein the first transducer is positioned in the conduit between the nozzle and the mold and the second transducer is located at the end of the mold opposite from the inlet end. The first transducer is activated and fill time begins when the pressure exerted thereon reaches 2000 psi. The second transducer is activated and fill time ends when the pressure thereon reaches 2000 psi. The dimensions of the mold are 16.26 cm × 1.27 cm × 0.3175 cm, the inside diameter of the conduit connecting the nozzle to the inlet end of the mold is 0.66 cm. The injection molding machine is a Newberry Injection Molding Machine (30 ton clamp/1 ounce barrel capacity) having a reciprocating screw. The gate opening (nozzle) into the mold is a rectangle (0.17 cm × 0.66 cm). The distance between the first and second transducers is 23.7 cm. NM for Sample No. C₁ means that the polycarbonate would not mold at the temperature used.
[11]ASTM D-523 (Gardner Gloss made at an angle of 60°).
ND — no molding was prepared.

As evidenced by the data of Table I, the blends of the present invention exhibit increased impact resistance and temperature resistance at a given processability. Also shown in Sample Nos. 13 and A₅, blends wherein the acid copolymer contains only 2 weight percent acid comonomer require additional polycarbonate to provide the desired impact strength (Gardner Dart). Such impact strength is also achieved by the inclusion of additional rubber into the blend of Sample No. A₅.

What is claimed is:

1. A heterogeneous blend comprising the following components: (1) a polycarbonate of a dihydric phenol blended with (2) an acid copolymer of a monovinylidene aromatic monomer and an α, β-ethylenically unsaturated carboxylic acid, said components being present in proportions such that the blend has (a) a Gardner Dart impact strength of at least about 100 inch-pounds, (b) a notched Izod impact strength of at least about 3 foot-pounds/inch of notch, (c) a heat resistance of at least about 210° F. as determined by ASTM D-648 (unannealed at 66 pounds per square inch) and (d) a processability (injection pressure) less than about 9000 pounds per square inch at a mold fill time of 3.0 seconds as determined by the test procedure for Injection Pressure set forth in footnote (10) of Table I hereof.

2. The blend of claim 1 wherein the dihydric phenol is a bis(hydroxyphenyl)alkylidene, the monovinylidene aromatic monomer is styrene and the unsaturated acid is acrylic acid or methacrylic acid.

3. The heterogeneous blend of claim 1 comprising the following components: (1) a polycarbonate of a dihydric phenol blended with (2) a rubber component, (3) an acid copolymer of a monovinylidene aromatic monomer and an α, β-ethylenically unsaturated carboxylic acid and (4), as an optional component, a compatible polymer of a polar monomer other than an acid; said rubber component containing a copolymer of a rubber polymer substrate grafted with a portion of the acid copolymer, the compatible polymer or a mixture of the acid copolymer and the compatible polymer wherein said graft copolymer is present in an amount sufficient to measurably increase the impact resistance of the blend, said polar monomer being a polymerizable ethylenically unsaturated organic compound which bears a polar group having a group moment in the range from about 1.4 to about 4 Debye units determined in accordance with Smyth, C.P., *Dielectric Behavior and Structure*, McGraw-Hill Book Company, Inc., New York (1955), said components being present in proportions such that the blend has (a) a Gardner Dart impact strength of at least about 100 inch-pounds, (b) a notched Izod impact strength of at least about 3 foot-pounds/inch of notch, (c) a heat resistance of at least about 210° F. as determined by ASTM D-648 (unannealed at 66 pounds per square inch) and (d) a processability (injection pressure) less than about 9000 pounds per square inch at a mold fill time of 3.0 seconds as determined by the test procedure for Injection Pressure set forth in footnote (10) of Table I hereof.

4. The blend of claim 3 wherein the dihydric phenol is a bis(hydroxyphenyl)alkylidene, the acid copolymer is a copolymer of styrene and acrylic acid or methacrylic acid or a blend of styrene/acrylic acid copolymer and styrene/methacrylic acid copolymer, the compatible polymer is a polymer of an ethylenically unsaturated nitrile, or an alkyl ester of an ethylenically unsaturated carboxylic acid, the rubber component is a diene rubber polymer or a butyl acrylate rubber polymer wherein a portion of said rubber polymer is grafted with a portion of the acid copolymer or the compatible polymer.

5. The blend of claim 4 which consists essentially of from about 25 to about 88 weight percent of the polycarbonate, from about 10 to about 70 weight percent of the acid copolymer, from about 0 to about 35 weight percent of the compatible copolymer and from about 2 to about 30 weight percent of the rubber polymer.

6. The blend of claim 4 wherein the polycarbonate is a homopolycarbonate of bisphenol-A, the compatible copolymer is a styrene/acrylonitrile copolymer and the rubber polymer is a polymer of butadiene wherein a portion of the rubber polymer is grafted with a portion of the styrene/acrylonitrile copolymer.

7. The blend of claim 5 wherein the rubber polymer is a polymer of butadiene wherein a portion of the rubber polymer is grafted with a portion of the acid copolymer.

8. The blend of claim 4 wherein the polycarbonate is a homopolycarbonate of bisphenol-A, the compatible copolymer is styrene/methyl methacrylate copolymer and the rubber polymer is a polymer of butadiene wherein a portion of the rubber polymer is grafted with a portion of the styrene/methyl methacrylate copolymer.

9. The blend of claim 4 wherein the acid copolymer contains an alkyl acrylate or alkyl methacrylate.

10. The blend of claim 4 wherein the acid copolymer is a copolymer of styrene, methyl methacrylate and methacrylic acid.

* * * * *